United States Patent Office 3,592,947
Patented July 13, 1971

3,592,947
HALOGENATED VAT DYESTUFF OF THE DIPHTHALOYL PHENANTHRIDONE SERIES
Charles W. C. Stein, Westfield, N.J., assignor to GAF Corporation, New York, N.Y.
No Drawing. Filed Dec. 27, 1967, Ser. No. 693,753
Int. Cl. C07d 39/02
U.S. Cl. 260—272
4 Claims

ABSTRACT OF THE DISCLOSURE

An olive green vat dyestuff of relatively low infra-red reflectance having the formula:

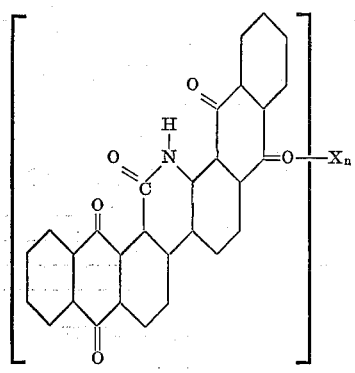

wherein X is nuclearly substituted bromine or chlorine; and $n$ has an average value of 1 to 4.

---

This invention relates to new vat dyestuffs of the diphthaloyl phenanthridone type effective for producing on cellulose fibers olive green shades of relatively low infra-red reflectance characteristics.

Due to the increased usage of infra-red light sources and observation methods utilizing such light, the problem of camouflage in modern warfare has become much more complex. Dyestuffs for uniforms must be of such character that they are capable of blending into the terrain when viewed with infra-red light. Since the background infra-red reflection of a natural woodland setting averages somewhere between 20 and 30% infra-red reflection, the percentage reflection of the dyed uniforms must lie in this range in order for those uniforms to be inconspicuous to the enemy observer.

Most vat dyes which have been used in the past for military uniforms have suitable drab camouflaging colors. However most of these dyes also show a high degree of reflectance of infra-red light.

D.P. 499,352 (1930) (Friedlander 17, 1384) describes the preparation of diphthaloyl phenanthridone by the potassium dichromate oxidation of a Vat Olive Green B suspension in dilute sulfuric acid. Such a vat dyestuff imparts exceptionally low infra-red reflectance to the dyed cloth. However it suffers from poor lightfastness and chlorine-fastness properties.

It is an object of this invention to provide novel vat dyestuffs which will not be subject to one or more of the above disadvantages. Another object of the invention is the provision of such dyestuffs having an infra-red reflectance of less than 30%. Still another object of the invention is the provision of such dyestuffs having improved chlorine and lightfastness properties. Other objects and advantages will appear as the description proceeds.

The attainment of the above objects is made possible by the present invention which comprises the provision of dyestuffs of the above Formula I. These dyestuffs have been found to yield olive green dyeings having relatively low infra-red reflectance, though slightly higher than the unhalogenated precursors, and relatively improved chlorine and lightfastness characteristics especially desirable for military use. Since their infra-red reflectances broadly range from about 15 to 25%, they may be admixed with other dyes, often necessary to achieve a particular shade, which have higher reflectances, to produce dye mixtures whose infra-red reflectances still fall within the desired 20–30% range.

In the above Formula I, X is preferably bromine, but may be chlorine. It will be understood that the products of the invention are mixtures of dyestuff molecules some of which may be unhalogenated and the remainder containing different amounts of halogen substitution, and that $n$ represents the average degree of halogen substitution in the mixture. The preferred degree or concentration of halogen substitution in the mixture is about 20–25% by weight ($n$ is about 1 to 2), although good results are attained with a range of 18.5 to 41.4% ($n$ is about 1 to 4).

These dyestuffs are readily prepared by halogenation of diphthaloyl phenanthridone in a liquid solvent or diluent medium in the presence of a halogen carrier such as iodine according to known procedures. Preferred media include concentrated sulfuric acid, chlorosulfonic acid, nitrobenzene and the like. Halogenation temperatures generally range from about 10 to 60° C. Isolation of the desired halogenated product is carried out in known manner, such as by drowning in water and filtering the precipitated product. With volatile reaction media such as nitrobenzene, precipitation of the product may be accomplished by volatilization of the medium.

The dyestuffs of this invention dye cellulose such as cotton and other vegetable fibers from an alkali hydrosulfite vat in olive green shades of good fastness properties and infra-red reflectances of about 15–25%.

The following examples are only illustrative of preferred embodiments of the invention and are not to be regarded as limitative. All parts and proportions referred to herein and in the appended claims are by weight unless otherwise indicated.

EXAMPLE I

One hundred twenty parts of 100% sulfuric acid are mixed with 280 parts chlorosulfonic acid. The mixture is cooled to 10–15° C. and 1 part of iodine is added, followed by the slow addition of 40 parts of diphthaloyl phenanthridone. After stirring the mixture for 1 hour at 15–20° C. 14 parts of bromine are dropped in slowly and the mixture allowed to stir and warm up to room temperature. After stirring until all the bromine is consumed the mixture is drowned into a mixture of ice and water, then heated to 90–95° C. for 1 hour and filtered hot. A dark greenish product is obtained with a bromine analysis of 23.4%, i.e. having Formula I above wherein X is Br and $n$ has an average value corresponding to 23.4% Br, or within the range of 1 to 2. When made into a dispersed paste with for example sodium lignin sulfonate, the product dyes cotton from the vat in olive green shades and the dyed fabric shows low infra-red reflectance. Lightfastness and wash tests show good results.

EXAMPLE II

On hundred twenty parts of 100% sulfuric acid are mixed with 280 parts chlorosulfonic acid. The mixture is cooled to 10-15° C. and 1 part of iodine is added, followed by the slow addition of 40 parts of diphthaloyl phenanthridone. After stirring the mixture for 1 hour at 15-20° C., 24 parts of bromine are dropped in slowly and the mixture allowed to stir and warm up to room temperature. After stirring until all the bromine is consumed the mixture is drowned and worked up as above. The product contains 41.4% bromine on the dry basis (ca. 4 gram atoms of bromine per molecule).

A dispersed paste of this product dyes cotton from the vat in olive green shades with low infra-red reflectance and great improvement in light and chlorine-fastness compared to the unbrominated product.

EXAMPLE III

A similar experiment to Example II except that 18.5 parts of bromine are added, gives a product containing 30.9% bromine (over 2 gram atoms of bromine per molecule). This product dyes cotton from the vat an olive green shade with good lightfastness and low infra-red reflectance.

EXAMPLE IV

Into a mixture of 100 parts nitrobenzene, 10 parts diphthaloyl phenanthridone and 1 part iodine is slowly added 6 parts bromine at room temperature. The mixture is stirred for 1 hour and heated at 35-40° C. until bromination is complete. The nitrobenzene is then steam stripped off to obtain a product of Formula I above containing 20-25% bromine. After conditioning by slurrying in sulfuric acid, drowning in water and filtering, the product has properties like those of Example I.

This invention has been disclosed with respect to certain preferred embodiments, and it will be understood that modifications and variations thereof will become obvious to persons skilled in the art and are intended to be included within the spirit and purview of this application and the scope of the appended claims.

I claim:
1. A dyestuff of the formula

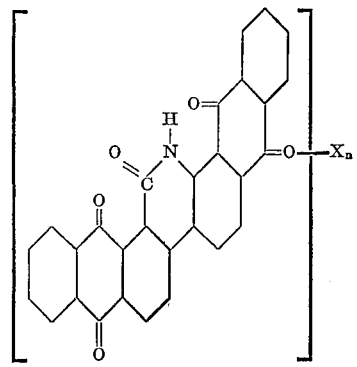

wherein
X is nuclearly substituted bromine or chlorine; and
$n$ has an average value of 1 to 4.

2. A dyestuff as defined in claim 1 wherein X is Br.
3. A dyestuff as defined in claim 2 wherein $n$ has an average value of about 1 to 2.
4. A dyestuff as defined in claim 1 wherein $n$ has an average value of about 1 to 2.

References Cited
UNITED STATES PATENTS

| | | | |
|---|---|---|---|
| 897,439 | 2/1933 | Neresheimer | 260—272 |
| 1,957,593 | 5/1934 | Heidenreich et al. | 260—272 |
| 2,157,991 | 5/1939 | Mieg et al. | 260—272 |
| 2,392,794 | 1/1946 | Zerweck | 260—274 |

DONALD G. DAUS, Primary Examiner

U.S. Cl. X.R.

260—694